T. A. WILLARD.
STORAGE BATTERY.
APPLICATION FILED JULY 6, 1915.
1,226,290.
Patented May 15, 1917.
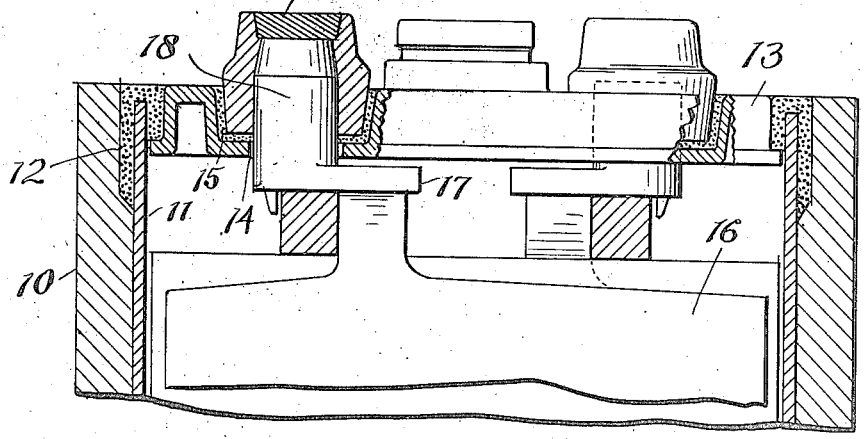
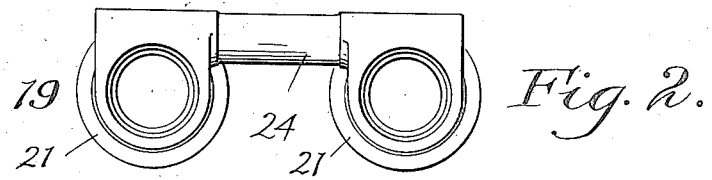
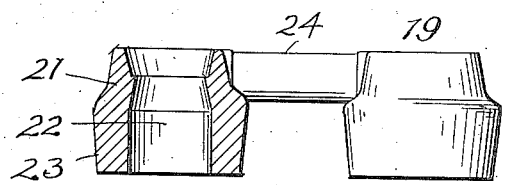
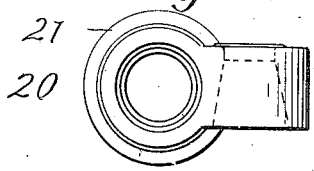
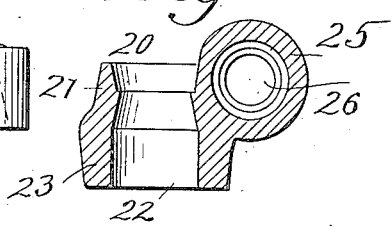
Inventor
Theodore A. Willard
by Thurston & Kwis
Attys.

UNITED STATES PATENT OFFICE.

THEODORE A. WILLARD, OF CLEVELAND, OHIO, ASSIGNOR TO WILLARD STORAGE BATTERY COMPANY, OF CLEVELAND, OHIO, A CORPORATION OF WEST VIRGINIA.

STORAGE BATTERY.

1,226,290.  Specification of Letters Patent.  Patented May 15, 1917.

Application filed July 6, 1915. Serial No. 38,168.

*To all whom it may concern:*

Be it known that I, THEODORE A. WILLARD, a citizen of the United States, residing at Cleveland, in the county of Cuyahoga and State of Ohio, have invented a certain new and useful Improvement in Storage Batteries, of which the following is a full, clear, and exact description.

This invention relates to storage batteries, and particularly to means for sealing the terminal posts to prevent creepage of battery solution upwardly along the posts to the exterior of the cover.

This application is a continuation of and covers a modification of the construction constituting the subject matter of a copending application filed by me on the 12th day of May, 1915, No. 27,481, entitled "Storage battery."

In the co-pending application above referred to the post is automatically sealed by the connector provided with a depending flange or petticoat, which, when the connector is placed on the terminal post, extends down into sealing compound contained in a receptacle in the shape of a groove formed in the cover and surrounding the terminal post.

The present construction is similar in many respects to my prior construction, but differs therefrom in the construction or form of the connector and in the form of the receptacle into which the connector extends and is sealed.

The invention may be briefly summarized as consisting in certain novel details of construction and combinations and arrangements of parts which will be described in the specification and set forth in the claims.

In the accompanying sheet of drawings, Figure 1 is a sectional view through the upper portion of a storage battery equipment of my invention; Figs. 2 and 3 are, respectively, a top view and a sectional side view of one form of connector embodying my invention; Figs. 4 and 5 are top and sectional views, respectively, of another form of connector embodying my invention.

Referring now to the drawings, 10 represents a battery box and 11 one of the jars which is fitted into the box and is sealed therein at the top by sealing compound 12. The jar is provided with a cover 13 which may be of hard rubber and which is sealed to the top of the jar. This cover, which is of irregular shape, is provided with openings 14 for terminal posts of the battery and with a receptacle preferably in the form of a depression or recess 15 surrounding each opening 14.

The battery jar contains the usual positive and negative plates 16, which are connected in the customary manner by straps 17 provided with terminal posts 18 which extend upwardly through the openings 14 in the cover. Fitted onto the upper portions of the terminal posts are connectors which may be cell connectors 19, shown in Figs. 2 and 3, or terminal connectors 20 shown in Figs. 4 and 5. Both connectors are provided with socketed body portions 21, each containing a vertical socket 22, and each having a downwardly projecting part 23. The cell connector 19 includes two such body portions 21 and a connecting bar 24, while the terminal connector 20 has one such socketed body portion and is provided at the side of the body portion with a lug or boss 25 containing a socket 26 into which the end of a terminal for a flexible conductor is adapted to be secured. It will be observed that the upper part of the socket 22 in each body portion of the connector is beveled in opposite directions and that the portion of the socket in the downward extending part 23 of the connector is straight and in this instance is cylindrical. When the connector is placed on the terminal post the part 23 thereof projects well down into the recess or depression 15 of the cover nearly to the bottom of the recess, as shown in Fig. 1, this part of the connector fitting closely around the terminal post. The upper end of the post is beveled, as shown, and is fitted into the correspondingly beveled part of the socket. The connector is usually secured onto the post by being lead burned thereto, the top of the socket above the post being filled with melted lead which is shown at 27.

Before the connector is placed in position on the terminal post the recess or depression 15 is filled or partly filled with sealing compound, and when the connector is placed in position the lower part 23 is pushed down into the sealing compound and preferably before being placed on the post the connector is heated so that it may pass through the sealing compound. When the connector is lead-burned to the post heat passes by conduction down along the lower part of the connector and melts the sealing compound so that the post is thus very effectively and automatically sealed against creepage or leakage of the battery solution to the exterior of the cover. To prevent the sealing compound running down through the opening 14 along the lower part of the post, this opening may fit rather closely to the post, or, if there is a space between the cover and the post at this point this space may be closed by calking.

It will be observed that when the connector is in place and sealed in the cover in the manner above explained, the external appearance of the connector is very similar to that of my prior construction and as disclosed in the aforesaid co-pending application. However, with the present construction the cover does not have the upstanding flange nor does the lower or depending part of the connector as loosely or freely surround the post, but in this case fits rather closely onto the post, although it is not essential that it tightly engage the post.

The terminal post is here shown as circular or annular in cross section, and of course the opening in the cover and the socket in the body portion of the connector are correspondingly shaped. However, it is not essential that the post be circular in cross section, as it may assume any other shape such as square or rectangular, but whatever the cross-sectional shape of the post, the opening 14 and the recess and depression 15 in the cover, and also the socket and the body portion of the connector will be correspondingly shaped.

Having described my invention, I claim:

1. In a storage battery, a cover having an opening for a terminal post and having an offset portion extending about and forming a receptacle surrounding said opening, a terminal post extending upwardly through the opening, a connector on the post having a body portion which extends downwardly along the post substantially in contact therewith into the said receptacle and sealed therein.

2. In a storage battery, a cover having an opening for a terminal post and a receptacle in the form of a recess or depression surrounding the opening, a terminal post extending upwardly through the opening, a connector on the post having a body portion which extends downwardly along the post substantially in contact therewith into the said recess or depression and sealed therein.

In testimony whereof, I hereunto affix my signature in the presence of two witnesses.

THEODORE A. WILLARD.

Witnesses:
 L. I. PORTER,
 A. J. HUDSON.